June 12, 1945.  H. SEBELL  2,378,041
PROCESS OF FORMING CAN-END BLANKS
Filed April 6, 1942  2 Sheets-Sheet 1

Inventor.
Harry Sebell
by Heard Smith & Tennant.
Attys

June 12, 1945.  H. SEBELL  2,378,041
PROCESS OF FORMING CAN-END BLANKS
Filed April 6, 1942  2 Sheets-Sheet 2
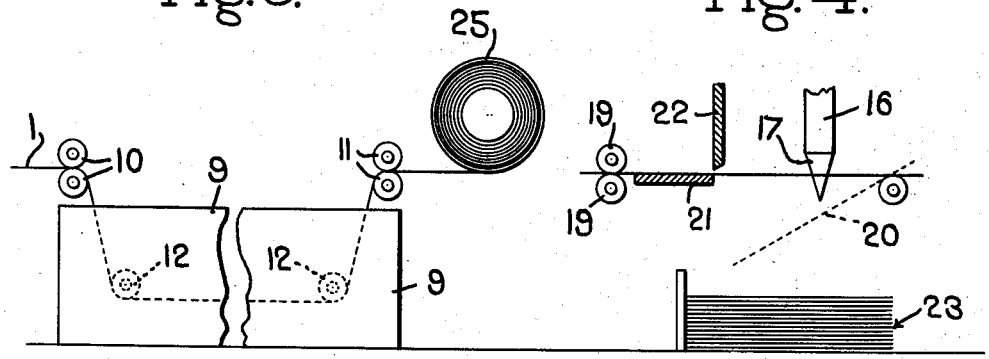
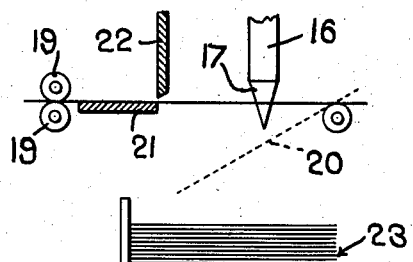
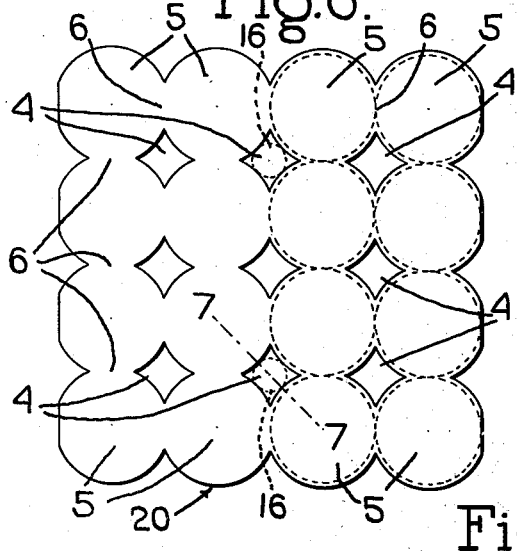
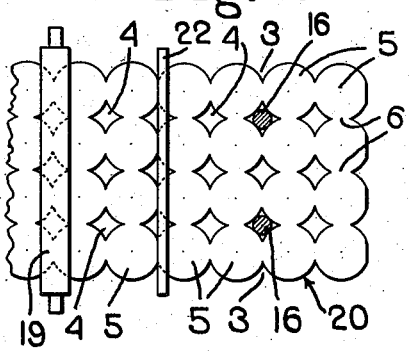
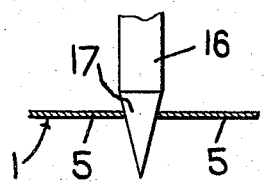
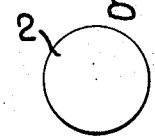
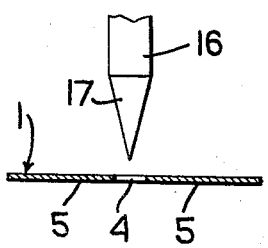
Inventor.
Harry Sebell
by Heard Smith & Tennant.
Attys.

Patented June 12, 1945

2,378,041

UNITED STATES PATENT OFFICE 2,378,041

PROCESS OF FORMING CAN-END BLANKS

Harry Sebell, Marblehead, Mass.

Application April 6, 1942, Serial No. 437,765

1 Claim. (Cl. 29—148)

This invention relates to a method of making various articles, such for instance as tin-coated can-end blanks, from sheet metal, and one of the objects of the invention is to provide an improved method by which the usual number of articles having the usual thickness of tin coating can be obtained from a given quantity of sheet metal while using a considerably less amount of tin or other coating metal to provide the tin coating for the blanks, than is required by the present methods of manufacture, thereby effecting a considerable saving in the amount of tin or other coating metal used in making a given number of can-end blanks, or other articles.

The method now commonly employed in making can-end blanks is to subject black plate, either in web form or in the form of sheets, to a tinning operation by which the entire surface of the web or sheet is provided with a tin coating, and subsequently to cut the can-end blanks from such tinned web or sheet.

In cutting from sheet metal any circular articles, such as can-end blanks, or articles of any non-rectangular shape, there is always considerable waste or scrap, and where the entire surface of the web or sheet is provided with a tin coating before the can-end blanks, or other articles, are cut therefrom, all of the scrap resulting from blanking out such articles will have a tin coating. The amount of tin which is used in coating this scrap is, of course, wasted so far as providing a tin coating for the can-end blanks, or other articles, is concerned.

In accordance with my present invention I propose to cut from the web or sheet of black plate the greater part of that portion thereof which constitutes the scrap when the can-end blanks are finally cut out from the web or sheet, thereby providing such web or sheet with a plurality of separate spaced but connected article-forming areas which are interspersed with openings through the web or sheet, each area being of the proper size and shape to permit of a can-end or other article to be cut out therefrom. The web or sheet, made up of these integrally connected but separate article-forming areas, is then subjected to a tinning operation by which it is provided with the required tin coating, and subsequently an article is cut out of each of said areas. In this way a very material saving in the amount of tin necessary for producing a given number of can-ends, or other articles, is effected because no tin is used in coating the greater portion of the scrap resulting from cutting said number of can-ends from a sheet or web.

A further object of the invention is to provide a novel method by which the openings formed in the web or sheet when the article-forming areas are being produced may be made use of in properly indexing the sheet or web for the step of cutting the can-end or other article from each article-forming area.

In order to give an understanding of the invention I have illustrated some selected embodiments thereof in the accompanying drawings which will now be described.

In the drawings:

Fig. 3 is a fragmentary schematic view showing a different embodiment of the invention wherein the tinned web is rolled into a coil from which articles are subsequently cut;

Fig. 4 is a view illustrating the operation of cutting the tinned web into sheets;

Fig. 5 is a plan view of Fig. 4;

Fig. 6 is an enlarged view illustrating a sheet which has had removed therefrom substantially all the waste or scrap resulting from the operation of cutting the can-end blanks therefrom;

Figs. 7 and 8 illustrate the manner in which the sheet or web is properly indexed for the final operation of cutting the can-end blanks therefrom;

Fig. 9 is a view of one of the can-end blanks.

Figure 1:
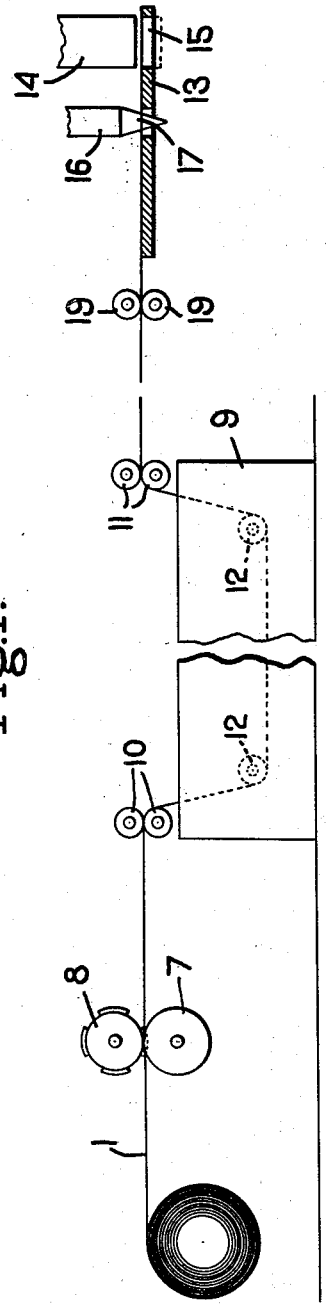
Fig. 1 is a schematic lay-out showing the operation of cutting the waste material from the web or sheet, tinning the web or sheet, and then finally cutting the can-end blanks or other articles therefrom.
Figure 2:
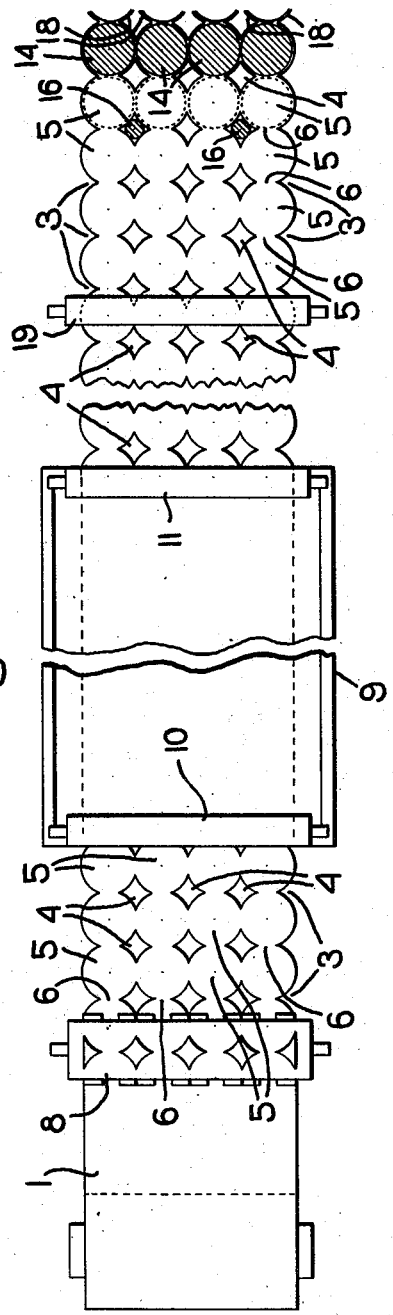
Fig. 2 is a plan view of Fig. 1.

Referring first to Figs. 1 and 2, I indicates a web or strip of black plate from which articles are to be subsequently blanked out, the articles herein shown being circular articles 2 which might constitute can-end blanks.

When such circular articles are cut from a web or sheet there is always a considerable amount of scrap left and in accordance with my present invention I propose to remove from the entire surface of the web 1 the greater part of that portion thereof which constitutes the scrap or waste due to the blanking out from the web of the circular articles 2 before the tinning operation. The removing of this material from the entire surface of the web which results not only in the formation of the scalloped edges 3 along the opposite sides of the web, but it also results in dividing the entire surface of the web into separate article-forming areas 5 which are interspersed with apertures 4 where material has been cut out from the web. This removal of scrap material from the web provides rows of separate areas 5 extending transversely of the web, each of which areas is composed of that portion thereof which is subsequently to form a can-end blank, (the portion shown in dotted lines in Figs. 2 and 6) and also a narrow margin surrounding each of said portions. The various areas 5 are integrally connected together by means of these narrow margins as clearly seen in Fig. 6 so that after the scrap has been removed from the web it still preserves its web shape and can be handled as a web. The material which is removed, however, in forming the scalloped edges 3 and the apertures 4 constitutes the greater portion of the scrap resulting from cutting the articles 2 from the web. This removal of the scrap portion from the web may be accomplished by means of any suitable dies and as illustrative of this operation I have shown two rotary cutting dies 7 and 8 between which the web 1 passes, said dies having male and female cutting edges so that the passage of the web between them results in cutting out the apertures 4 and giving the edges 3 the scalloped shape shown.

After the larger portion of the scrap has thus been removed from the web 1 then it is subjected to a tinning operation by which the web comprising the connected article-forming areas 5 is coated with a tin coating. This tinning operation may be carried out by any of the known methods and as illustrative of one method I have indicated a tin-coating element 9 by which the tin coating is deposited on the web 1 by the electrolytic process, suitable guide rolls 10, 11 and 12 being employed to properly direct the web in its passage to and from the electro-plating apparatus.

After the prepared web 1 has thus been provided with its tin coating then the individual articles 2 can be cut from the various article-forming areas 5. This may be accomplished either by cutting the articles directly from the tinned prepared web or the web may first be cut into sheets or sections and the articles then cut from the areas 5 of each sheet or section. This step of cutting the articles 2 from the areas 5 is illustrated at the right hand end of Figs. 1 and 2. The actual cutting of each article 2 from one of the article-forming areas 5 may be accomplished by any suitable or usual stamping machine and as illustrating the operation there is shown a bed or plate 13 over which the sheet or web is fed and dies 14 that cooperate with the plate 13 for blanking out the articles 2, the bed 13 being provided with openings 15 which cooperate with the dies 14 to cut out the articles 2.

The preliminary step of removing the scrap from the web may be so carried out that each area 5 is only slightly larger than the article 2 to be cut therefrom, as shown in Figs. 2 and 6 in which the dotted circles indicate the lines on which the various areas 5 are cut to produce the can-end blanks 2.

In order that the articles 2 may be properly cut from various areas 5 it is necessary that the tinned web or sheet should be accurately indexed as it is presented to the dies 14. I propose to accomplish this by means of indexing elements 16 which cooperate with certain of the apertures 4 with which the web is provided. Each indexing element 16 is provided with a pointed lower end 17 and they are operated synchronously with the dies 14 so that before the dies perform the blanking out operation the pointed ends 17 of the indexing members have been inserted into some of the apertures 4. The engagement of the conical ends 17 of these indexing elements with the edges of the apertures 4 will correctly position or index the web for the operation of the blanking-out dies 14. As each article 2 is cut from one of the areas 5 there will be left a small amount of scrap 18 which is provided with the tin coating, but this amount of scrap is only a very small percentage of the total scrap resulting from blanking out the can-ends 2 and the amount of tin wasted in tin-coating the scrap portion 18 is negligible.

Instead of cutting the articles 2 directly from the web, I may cut the web into sections or sheets, such as shown in Fig. 6, and then cut the individual articles 2 from the areas 5 of said sheets. This is illustrated in Figs. 4 and 5 which shows the web being fed by the feed rollers 19 to a cutter by which the web is cut transversely at intervals to form the sheets 20 shown in Fig. 6. This cutter may comprise a ledger blade 21 and a reciprocating cutter blade 22 which is adapted to sever the sheets 20 from the web at proper intervals. It is necessary, of course, that the line along which each sheet 20 is severed from the web should be accurately located between two adjacent transverse rows of areas 5 and to provide for this I propose to use the indexing members 16 for properly indexing or positioning the end of the web each time the cutter blade 22 is operated. These indexing elements 16 will be vertically movable and will be lowered into their operative indexing position, shown in Figs. 7 and 8, just before the blade 22 is given its cutting movement. As the sheets 20 are severed from the web they will accumulate in a pile 23 and can be subsequently transferred to a stamping machine by which the articles 2 are blanked out from the areas 5.

In Fig. 3 a web 1 which has been acted on by the cutters 7 and 8 is shown passing through an electroplating device 9 by which it is provided with a coating of tin, and then being wound up into a roll or coil 25. The web comprising the roll or coil may be subsequently cut into sheets or sections 20 from which the can ends 2 are blanked out, or such can ends may be cut directly out of the prepared web as it is unrolled from the roll or coil 25.

In this invention the cutting of the apertures 4 in the web 1 not only removes from the web a very considerable part of the material which constitutes the scrap or waste resulting from blanking out the can-end blanks 2, but it provides indexing apertures which have a fixed predetermined relation to the article-forming areas 5, so that such apertures can be used to correctly index or position the prepared web either for the operation of the blanking-out dies 14, as shown in Figs. 1 and 2, or for the operation of the cutter 21 as shown in Figs. 4 and 5. Such apertures 4 also seem to properly index or position the sheets 20 when the can-end blanks 2 are cut therefrom.

I claim:

The steps in the method of forming can-end blanks from a black plate strip, the width of which is several times greater than the diameter of the can-end blank to be cut therefrom, which steps comprise feeding the strip forward, cutting out of the entire surface of the strip and progressively from one end to the other thereof all of that part of the strip which constitutes the scrap when can-end blanks are blanked out therefrom except a narrow margin around each portion of the strip that is subsequently to constitute a can-end blank, and performing such cutting operation so as to divide the entire surface of the strip into separate article-forming areas which are arranged in rows extending both transversely and longitudinally of the strip and which are interspersed with openings formed in said strip, each area comprising a portion that is subsequently to constitute a can-end blank and the surrounding narrow margin, which areas are integrally connected by said margins, subjecting the black plate strip thus prepared to a tinning operation, cutting a can-end blank from each of said areas by a cutting die having a fixed position with reference to the feeding movement of the strip, and indexing the strip during the cutting out of each can-end blank by inserting an indexing element into certain of the apertures formed in the strip by the cutting out of the scrap.

HARRY SEBELL.